United States Patent
Takahashi

(10) Patent No.: US 11,966,102 B2
(45) Date of Patent: Apr. 23, 2024

(54) SPECTACLE LENS AND SPECTACLES

(71) Applicant: TOKAI OPTICAL CO., LTD., Okazaki (JP)

(72) Inventor: Hirotoshi Takahashi, Okazaki (JP)

(73) Assignee: Tokai Optical Co., Ltd., Okazaki (JP)

( * ) Notice: Subject to any disclaimer, the term of this patent is extended or adjusted under 35 U.S.C. 154(b) by 667 days.

(21) Appl. No.: 17/161,810

(22) Filed: Jan. 29, 2021

(65) Prior Publication Data
US 2021/0149221 A1    May 20, 2021

Related U.S. Application Data

(63) Continuation of application No. PCT/JP2019/035025, filed on Sep. 5, 2019.

(30) Foreign Application Priority Data

Sep. 25, 2018 (JP) ................. 2018-179148

(51) Int. Cl.
*G02C 7/10* (2006.01)
*G02B 1/11* (2015.01)
(Continued)

(52) U.S. Cl.
CPC ............... *G02C 7/104* (2013.01); *G02B 1/11* (2013.01); *G02B 5/283* (2013.01); *G02C 7/02* (2013.01)

(58) Field of Classification Search
CPC . G02B 1/18; G02B 1/14; G02B 1/115; G02B 1/111; G02B 1/10; G02B 1/11;
(Continued)

(56) References Cited

U.S. PATENT DOCUMENTS 5,776,594 A    7/1998 Austin
2015/0098058 A1    4/2015 De Ayguavives et al.
(Continued)

FOREIGN PATENT DOCUMENTS

JP    2015-520412 A1    7/2015
JP    6073355 B2    2/2017
(Continued)

OTHER PUBLICATIONS

International Search Report and Written Opinion (Application No. PCT/JP2019/035025) dated Nov. 19, 2019.
(Continued)

*Primary Examiner* — Travis S Fissel
(74) *Attorney, Agent, or Firm* — BURR PATENT LAW, PLLC

(57) ABSTRACT

A spectacle lens includes an optical multilayer film formed on at least one surface of a base. The spectacle lens is formed such that, in a reflectance distribution in a visible region, maximal values appear in a range of wavelengths that are not less than 440 nm and not greater than 460 nm and in a range of wavelengths that are not less than 620 nm and not greater than 640 nm. A blue light ray cutting rate calculated by using a calculation formula described in Japanese Industrial Standards "JIS T7333 Appendix C" is not less than 7% (preferably not less than 8%) in the spectacle lens. A YI value is not greater than 6 in the spectacle lens.

5 Claims, 5 Drawing Sheets

(51) Int. Cl.
  *G02B 5/28* (2006.01)
  *G02C 7/02* (2006.01)
(58) Field of Classification Search
  CPC ........... G02C 7/10; G02C 7/022; G03F 7/091;
  G03C 1/825
  USPC ........................................ 351/159.01, 44, 41
  See application file for complete search history.

(56) References Cited

U.S. PATENT DOCUMENTS

| | | |
|---|---|---|
| 2015/0103310 A1 | 4/2015 | De Ayguavives et al. |
| 2015/0234208 A1* | 8/2015 | De Ayguavives ....... G02C 7/10 |
| | | 351/159.62 |
| 2015/0234209 A1 | 8/2015 | Miyamoto et al. |
| 2017/0003520 A1 | 1/2017 | Iwasaki et al. |
| 2017/0351119 A1* | 12/2017 | Passard .................. G02C 7/104 |
| 2018/0373062 A1* | 12/2018 | Kamura ................. G02C 7/10 |
| 2019/0155058 A1 | 5/2019 | Takahashi |
| 2019/0369291 A1 | 12/2019 | Imai et al. |

FOREIGN PATENT DOCUMENTS

| | | |
|---|---|---|
| JP | 2018-141847 A1 | 9/2018 |
| WO | 2015/137282 A1 | 9/2015 |
| WO | 2018/037850 A1 | 3/2018 |

OTHER PUBLICATIONS

Extended European Search Report (Application No. 19864273.8) dated May 11, 2022.

* cited by examiner

SPECTACLE LENS AND SPECTACLES

This application is a Continuation of International Application No. PCT/JP2019/035025, filed on Sep. 5, 2019, which claims the benefit of Japanese Patent Application Number 2018-179148 filed on Sep. 25, 2018, the disclosures of which are incorporated by reference herein in their entireties.

BACKGROUND

Technical Field

The present invention relates to a spectacle lens that reduces (cuts) transmission of light (blue light rays, blue light) on the short wavelength side in a visible region, and spectacles using the spectacle lenses.

Background Art

The spectacle lens disclosed in Japanese Patent No. 6073355 has been known as a spectacle lens that cuts blue light rays and protects eyes of a wearer from blue light rays having relatively high energy.

The spectacle lens has, on each of front and back surfaces, an optical multilayer film in which six layers or eight layers are formed by alternately disposing $ZrO_2$ layers and $SiO_2$ layers. Therefore, the spectacle lens has a reflectance of around 6% in a range of wavelengths from about 380 nm (nanometers) to about 500 nm, and cuts blue light rays by reflection. Furthermore, a reflectance is reduced for visibility in a visible region other than the above range of the wavelengths.

SUMMARY

The spectacle lens cuts blue light rays and transmits light in other visible regions therethrough, and, thus, has a yellowish tint that is a complementary color of blue. Therefore, the visual field of a wearer of the spectacle lens becomes yellowish. Wearing of the yellow spectacle lens may be avoided in consideration of appearance in the case of the lens being worn.

A main object of the present invention is to provide a spectacle lens and spectacles that allow reduction of yellowness while protecting eyes from blue light rays.

In order to attain the aforementioned object, a first aspect of the invention is directed to a spectacle lens that includes an optical multilayer film formed on at least one surface side of a base. In the spectacle lens, maximal values in a reflectance distribution appear in a range of wavelengths that are not less than 440 nm and not greater than 460 nm and in a range of wavelengths that are not less than 620 nm and not greater than 640 nm. Further, in the spectacle lens, a blue light ray cutting rate calculated by using a calculation formula described in Japanese Industrial Standards "JIS T7333 Appendix C" is not less than 7%, and a YI value is not greater than 6.

A second aspect of the invention is based on the above-described invention, and a luminous reflectance on each surface is not higher than 2.5%.

A third aspect of the invention is based on the above-described invention, and a reflectance in a range of wavelengths that are not less than 400 nm and not greater than 700 nm is not higher than 12% on a surface farther from an eye, and a reflectance in a range of wavelengths that are not less than 400 nm and not greater than 700 nm is not higher than 6% on a surface closer to an eye.

In order to attain the aforementioned object, a fourth aspect of the invention is directed to spectacles that include the spectacle lens of the above-described invention.

A main effect of the present invention is achieved by providing a spectacle lens and spectacles that allow reduction of yellowness while protecting eyes from blue light rays.

DESCRIPTION OF EMBODIMENTS

Figure 1:
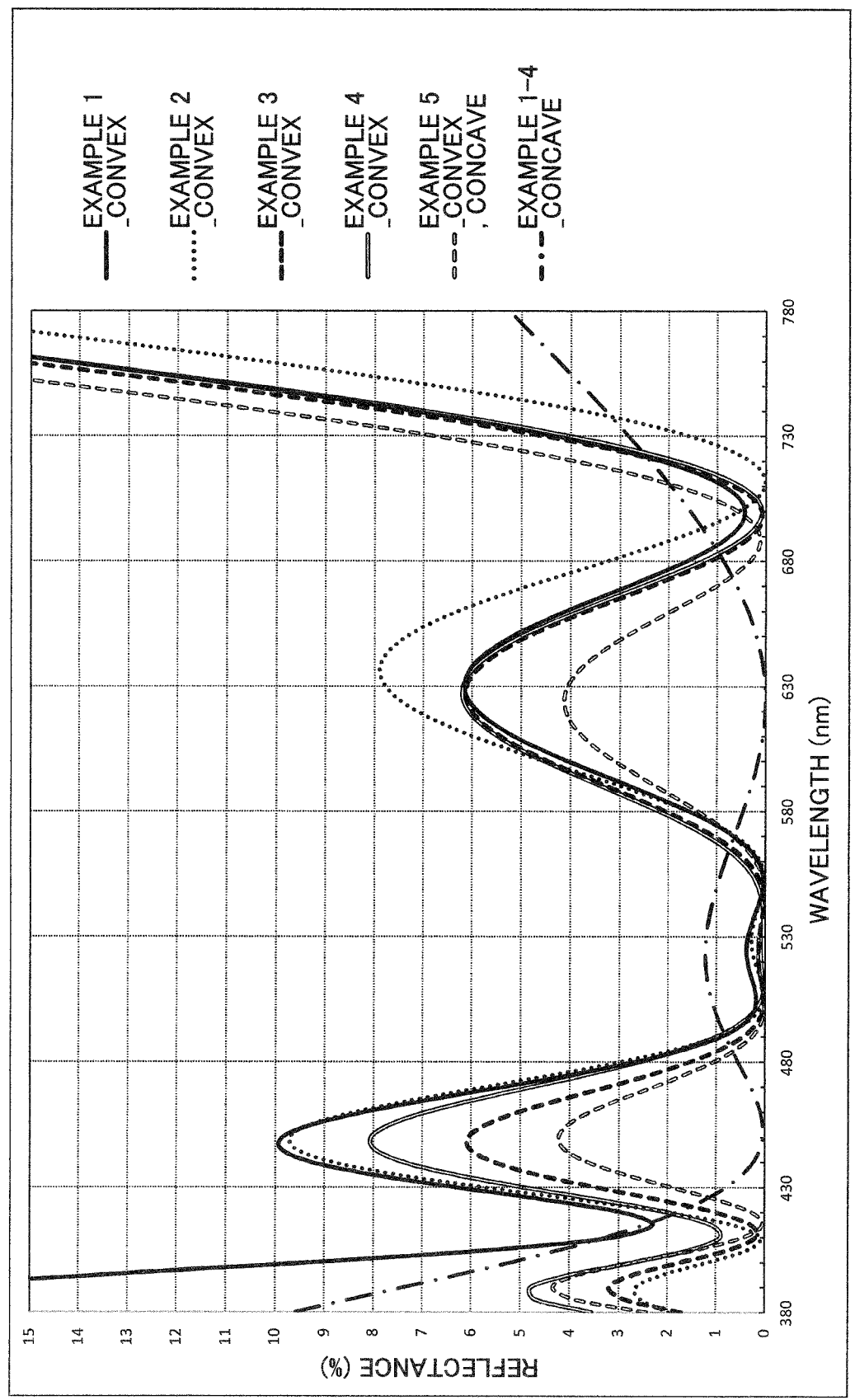
FIG. 1 shows a graph representing a spectral reflectance distribution in a visible region according to each of examples 1 to 5.

An exemplary embodiment of the present invention will be described below. The present invention is not limited to the embodiment described below.

A spectacle lens of the present invention includes a base, and an optical multilayer film formed on one surface side of the base or each of both surface sides of the base as appropriate.

As a material of the base, for example, glass or synthetic resin is used, and thermosetting resin is preferably used. For example, polyurethane resin, thiourethane resin, episulfide resin, polycarbonate resin, polyester resin, acrylic resin, polyether sulfone resin, poly(4-methylpentene-1) resin, diethylene glycol bis(allyl carbonate) resin, or a combination thereof is used. Furthermore, as a preferable material having a high refractive index, for example, polyurethane resin obtained by addition-polymerization of a polyisocyanate compound with at least one of polythiol or sulfur-containing polyol can be used. Moreover, as a preferable material having a high refractive index, episulfide resin obtained by addition-polymerization of an episulfide group with at least one of polythiol or sulfur-containing polyol can be used.

An ultraviolet absorber is preferably added to the base.

The thickness of the base is not particularly limited. However, the greater the thickness is, the higher the internal transmittance proportionally becomes, and the appearance and the weight of the spectacle lens are relatively degraded. Therefore, the thickness is preferably not greater than 4 mm (millimeters).

The spectacle lens may have an intermediate film disposed between the base and at least one of the optical multilayer films.

For example, a hard coating film may be formed as the intermediate film.

The hard coating film is preferably formed by uniformly applying a hard coating solution on the surface of the base.

As the hard coating film, organosiloxane-based resin containing inorganic oxide particles can be preferably used. The organosiloxane-based resin obtained by hydrolyzing and condensing alkoxysilane is preferably used. Specific examples of the organosiloxane-based resin include γ-glycidoxypropyltrimethoxysilane, γ-glycidoxypropyltriethoxysilane, methyl trimethoxysilane, ethyl silicate, and a combination thereof. The hydrolysis condensates of the alkoxysilanes are manufactured by hydrolyzing the alkoxysilane compound or a combination thereof by an acidic aqueous solution such as hydrochloric acid.

Meanwhile, specific examples of a material of the inorganic oxide particles include a sol of each of zinc oxide, silicon dioxide (silica particulates), aluminum oxide, titanium oxide (titania particulates), zirconium oxide (zirconia particulates), tin oxide, beryllium oxide, antimony oxide, tungsten oxide, and cerium oxide, and mixed crystals of two or more of the sols. The diameter of each inorganic oxide particle is preferably not less than 1 nm and preferably not greater than 100 nm, and more preferably not less than 1 nm and more preferably not greater than 50 nm in order to ensure transparency of the hard coating film. An amount (concentration) of the inorganic oxide particles to be blended is preferably not less than 40 wt % (weight percent) and preferably not greater than 60 wt % with respect to all the components of the hard coating film in order to ensure appropriate levels of hardness and toughness of the hard coating film. In addition, the hard coating solution may contain, for example, at least one of acetylacetone metal salt and ethylenediaminetetraacetic acid metal salt as a curing catalyst, and may further contain a surfactant, a colorant, a solvent, or the like as necessary in order to ensure adhesiveness to the base and/or facilitate formation, and the like.

A physical film thickness of the hard coating film is preferably not less than 0.5 μm (micrometers) and preferably not greater than 4.0 μm, and more preferably not less than 1.0 μm and more preferably not greater than 3.0 μm. The lower limit in the film thickness range is defined according to obtaining of a sufficient hardness becoming difficult if the thickness is less than this lower limit. Meanwhile, the upper limit therein is defined according to possibility that a problem with physical properties such as generation of cracks or fragility arises being significantly increased if the thickness is greater than this upper limit.

Furthermore, as the intermediate film, a primer film may be additionally disposed between the hard coating film and the surface of the base in order to enhance adhesiveness of the hard coating film. Examples of a material of the primer film include polyurethane-based resin, acrylic resin, methacrylic resin, organosilicon resin, and a combination thereof. The primer film is preferably formed by uniformly applying a primer solution to the surface of the base. The primer solution is a solution in which the above-described resin material and inorganic oxide particles are mixed in water or an alcohol-based solvent.

The optical multilayer film of the spectacle lens is formed on the base or the intermediate film.

The optical multilayer film is formed by, for example, a vacuum deposition method or a sputtering method.

The optical multilayer film is preferably formed such that low refractive index layers formed of low refractive index materials as metal oxides and high refractive index layers formed of high refractive index materials are alternately layered, and the total number of the layers is preferably an odd number (five layers, seven layers, or the like in total). More preferably, when the layer (closest to the base side) closest to the base is a first layer, the odd layers are the low refractive index layers and the even layers are the high refractive index layers.

Examples of the high refractive index material include zirconium oxide ($ZrO_2$), titanium oxide ($TiO_2$), tantalum oxide ($Ta_2O_5$), niobium oxide ($Nb_2O_5$), hafnium oxide ($HfO_2$), selenium oxide ($CeO_2$), and a mixture of two or more of them, and $ZrO_2$ is preferable.

Furthermore, examples of the low refractive index material include silicon oxide ($SiO_2$), aluminum oxide ($Al_2O_3$), calcium fluoride ($CaF_2$), magnesium fluoride ($MgF_2$), and a mixture of two or more of them, and $SiO_2$ is preferable.

Each of the number of the kinds of the high refractive index materials to be used and the number of the kinds of the low refractive index materials to be used is preferably not greater than two, and is more preferably one from the viewpoint of easy designing of the films and cost for forming the films.

The spectacle lens is formed by having the optical multilayer film such that the maximal values in a reflectance distribution in a visible region appear in a range of wavelengths that are not less than 440 nm and not greater than 460 nm, and in a range of wavelengths that are not less than 620 nm and not greater than 640 nm.

Furthermore, the spectacle lens is formed by having the optical multilayer film (in particular, arranged such that the maximal value of the reflectance appears in a range of wavelengths that are not less than 440 nm and not greater than 460 nm) such that a blue light ray cutting rate is not less than 7% (preferably 8%). Thus, the eyes of a wearer are protected from blue light rays.

Moreover, the spectacle lens is formed by having the optical multilayer film (in particular, arranged such that the maximal value of the reflectance appears in a range of wavelengths that are not less than 620 nm and not greater than 640 nm) such that the YI value is not greater than 6. Thus, the yellowness of the spectacle lens is reduced, and the spectacle lens can exhibit excellent visibility and appearance.

In addition, the spectacle lens is preferably formed by having the optical multilayer film such that a luminous reflectance (D65 light rays, viewing angle of 2 degrees) is not higher than 2.5% on each of the surface on a convex side (front surface side, side farther from the eye) of the base and the surface on a concave side (back surface side, a side closer to the eye) of the base. Thus, the optical multilayer film also acts as an antireflection film, reflection in a visible region is reduced by the optical multilayer film, and the spectacle lens exhibits more excellent visibility.

Furthermore, the spectacle lens is preferably formed by having the optical multilayer film such that a reflectance is not higher than 12% in a range of wavelengths that are not less than 400 nm and not greater than 700 nm on the convex side surface, and a reflectance is not higher than 6% in a range of wavelengths that are not less than 400 nm and not greater than 700 nm on the concave side surface. Thus, ghost is inhibited from occurring in the spectacle lens, and the spectacle lens exhibits more excellent visibility.

In the spectacle lens of the present invention, the intermediate film other than the hard coating film, or another kind of film such as an antifouling film (water repellent film•oil repellent film) may be additionally disposed between the optical multilayer film and the base and/or on the surface of the optical multilayer film. In a case where the optical multilayer films are formed on both surfaces, the other kinds of the films to be added may be made different or presence/absence of the film may be changed.

The spectacle lenses described above are used to produce spectacles that reduce yellowness and exhibit excellent visibility and appearance while protecting eyes from blue light rays.

Subsequently, examples 1 to 15 of the present invention and comparative examples 1 to 6 which do not belong to the present invention will be described with reference where appropriate to the drawings. The present invention is not limited to the examples described below. According to interpretation of the present invention, an example may be regarded as a comparative example or a comparative example may be regarded as an example.

These examples and comparative examples were implemented by plastic spectacle lenses. The base of each lens was formed of thermosetting resin for spectacles, and the plastic spectacle lens had a round shape and a standard size as a plastic spectacle lens.

The base was the same between the examples and the comparative examples, was a spherical lens having a lens center thickness of 1.9 mm and a power of S-0.00, had a refractive index of 1.60, and was formed of thiourethane resin. The base was not subjected to dyeing or the like, and the base itself was colorless and transparent.

In these examples and comparative examples, hard coating films were formed as the intermediate films on both surfaces by applying a hard coating solution.

The hard coating film was formed as follows by the hard coating solution being applied to the base and heated so as to be in contact with the base.

That is, 206 g of methanol, 300 g of methanol-dispersed titania sol (produced by JGC Catalysts and Chemicals Ltd., solid content: 30%), 60 g of γ-glycidoxypropyltrimethoxysilane, 30 g of γ-glycidoxypropylmethyldiethoxysilane, and 60 g of tetraethoxysilane were firstly dropped into a reaction vessel, and 0.01N (normal concentration) of hydrochloric acid aqueous solution was dropped into the mixture, and the obtained mixture was stirred and hydrolyzed.

Subsequently, 0.5 g of a flow regulating agent and 1.0 g of a catalyst were added, and the obtained mixture was stirred at room temperature for three hours, thereby forming the hard coating solution The hard coating solution was applied to both surfaces of the base of the lens, and heated at 120° C. for 1.5 hours and hardened, thereby forming the hard coating film having a film thickness of 2.5 μm.

The optical multilayer film was further formed on the hard coating layer on each of both surfaces in each of examples 1 to 5 and comparative examples 1 to 6.

By a vacuum deposition method, the optical multilayer film was firstly formed on the convex surface side (front surface side) of the spectacle lens, and the optical multilayer film was subsequently formed on the concave surface side (back surface side) of the spectacle lens. The temperature was set to 60° C. and the degree of vacuum was set to $8.0 \times 10^{-4}$ Pa (pascal) at the start of the deposition.

The optical multilayer films of examples 1 to 5 and comparative examples 1 to 6 were formed as indicated below in [Table 1] to [Table 11] such that the layer on the base side was a first layer. The optical multilayer film had five layers in total or seven layers in total, and the low refractive index layers located at the first, the third, the fifth, and the seventh layers were formed of $SiO_2$, and the second, the fourth, and the sixth layers were formed as high refractive index layers having refractive indexes higher than that of $SiO_2$. The refractive index of the high refractive index layer can be adjusted by a material to be selected and, further, can also be adjusted by a film forming rate, presence or absence of an ion-assisted process, a voltage value, a kind of ion, or the like. In the optical multilayer film of each of examples 1 to 5 and comparative examples 1 to 6, $ZrO_2$ was selected for the high refractive index layer, and the refractive index of the second layer was made different from those of the other high refractive index layers by changing conditions in the ion-assisted process. The refractive index of each layer is indicated in [Table 1] to [Table 11], and all the refractive indexes are those at a wavelength of 550 nm.

TABLE 1

| | Example 1 | | |
|---|---|---|---|
| | Material | Refractive index | Physical film thickness [nm] |
| Convex surface | | | |
| First layer | SiO2 | 1.4660 | 41.0 |
| Second layer | ZrO2 | 2.0558 | 126.0 |
| Third layer | SiO2 | 1.4660 | 167.0 |
| Fourth layer | ZrO2 | 2.0684 | 129.0 |
| Fifth layer | SiO2 | 1.4660 | 155.0 |
| Sixth layer | ZrO2 | 2.0684 | 17.0 |
| Seventh layer | SiO2 | 1.4660 | 111.0 |
| Concave surface | | | |
| First layer | SiO2 | 1.4660 | 70.0 |
| Second layer | ZrO2 | 2.0558 | 24.0 |
| Third layer | SiO2 | 1.4660 | 20.0 |
| Fourth layer | ZrO2 | 2.0684 | 95.0 |
| Fifth layer | SiO2 | 1.4660 | 85.0 |

TABLE 2

| | Example 2 | | |
|---|---|---|---|
| | Material | Refractive index | Physical film thickness [nm] |
| Convex surface | | | |
| First layer | SiO2 | 1.4660 | 40.0 |
| Second layer | ZrO2 | 2.0558 | 122.0 |
| Third layer | SiO2 | 1.4660 | 159.0 |
| Fourth layer | ZrO2 | 2.0684 | 134.0 |
| Fifth layer | SiO2 | 1.4660 | 174.0 |
| Sixth layer | ZrO2 | 2.0684 | 19.0 |
| Seventh layer | SiO2 | 1.4660 | 106.0 |
| Concave surface | | | |
| First layer | SiO2 | 1.4660 | 70.0 |
| Second layer | ZrO2 | 2.0558 | 24.0 |
| Third layer | SiO2 | 1.4660 | 20.0 |

TABLE 2-continued

Example 2

| | Material | Refractive index | Physical film thickness [nm] |
|---|---|---|---|
| Fourth layer | ZrO2 | 2.0684 | 95.0 |
| Fifth layer | SiO2 | 1.4660 | 85.0 |

TABLE 3

Example 3

| | Material | Refractive index | Physical film thickness [nm] |
|---|---|---|---|
| Convex surface | | | |
| First layer | SiO2 | 1.4660 | 29.0 |
| Second layer | ZrO2 | 2.0558 | 121.0 |
| Third layer | SiO2 | 1.4660 | 161.0 |
| Fourth layer | ZrO2 | 2.0684 | 128.0 |
| Fifth layer | SiO2 | 1.4660 | 170.0 |
| Sixth layer | ZrO2 | 2.0684 | 24.0 |
| Seventh layer | SiO2 | 1.4660 | 104.0 |
| Concave surface | | | |
| First layer | SiO2 | 1.4660 | 70.0 |
| Second layer | ZrO2 | 2.0558 | 24.0 |
| Third layer | SiO2 | 1.4660 | 20.0 |
| Fourth layer | ZrO2 | 2.0684 | 95.0 |
| Fifth layer | SiO2 | 1.4660 | 85.0 |

TABLE 4

Example 4

| | Material | Refractive index | Physical film thickness [nm] |
|---|---|---|---|
| Convex surface | | | |
| First layer | SiO2 | 1.4660 | 27.5 |
| Second layer | ZrO2 | 2.0558 | 121.5 |
| Third layer | SiO2 | 1.4660 | 161.0 |
| Fourth layer | ZrO2 | 2.0684 | 130.5 |
| Fifth layer | SiO2 | 1.4660 | 165.0 |
| Sixth layer | ZrO2 | 2.0684 | 22.5 |
| Seventh layer | SiO2 | 1.4660 | 107.0 |
| Concave surface | | | |
| First layer | SiO2 | 1.4660 | 70.0 |
| Second layer | ZrO2 | 2.0558 | 24.0 |

TABLE 4-continued

Example 4

| | Material | Refractive index | Physical film thickness [nm] |
|---|---|---|---|
| Third layer | SiO2 | 1.4660 | 20.0 |
| Fourth layer | ZrO2 | 2.0684 | 95.0 |
| Fifth layer | SiO2 | 1.4660 | 85.0 |

TABLE 5

Example 5

| | Material | Refractive index | Physical film thickness [nm] |
|---|---|---|---|
| Convex surface | | | |
| First layer | SiO2 | 1.4660 | 20.0 |
| Second layer | ZrO2 | 2.0558 | 122.0 |
| Third layer | SiO2 | 1.4660 | 160.0 |
| Fourth layer | ZrO2 | 2.0684 | 123.0 |
| Fifth layer | SiO2 | 1.4660 | 172.0 |
| Sixth layer | ZrO2 | 2.0684 | 26.0 |
| Seventh layer | SiO2 | 1.4660 | 103.5 |
| Concave surface | | | |
| First layer | SiO2 | 1.4660 | 20.0 |
| Second layer | ZrO2 | 2.0558 | 122.0 |
| Third layer | SiO2 | 1.4660 | 160.0 |
| Fourth layer | ZrO2 | 2.0684 | 123.0 |
| Fifth layer | SiO2 | 1.4660 | 172.0 |
| Sixth layer | ZrO2 | 2.0684 | 26.0 |
| Seventh layer | SiO2 | 1.4660 | 103.5 |

TABLE 6

Comparative Example 1

| | Material | Refractive index | Physical film thickness [nm] |
|---|---|---|---|
| Convex surface | | | |
| First layer | SiO2 | 1.4660 | 30.0 |
| Second layer | ZrO2 | 2.0558 | 120.5 |
| Third layer | SiO2 | 1.4660 | 148.0 |
| Fourth layer | ZrO2 | 2.0684 | 141.5 |
| Fifth layer | SiO2 | 1.4660 | 166.0 |
| Sixth layer | ZrO2 | 2.0684 | 19.0 |
| Seventh layer | SiO2 | 1.4660 | 107.5 |

TABLE 6-continued

Comparative Example 1

| | Material | Refractive index | Physical film thickness [nm] |
|---|---|---|---|
| Concave surface | | | |
| First layer | SiO2 | 1.4660 | 70.0 |
| Second layer | ZrO2 | 2.0558 | 24.0 |
| Third layer | SiO2 | 1.4660 | 20.0 |
| Fourth layer | ZrO2 | 2.0684 | 95.0 |
| Fifth layer | SiO2 | 1.4660 | 85.0 |

TABLE 7

Comparative Example 2

| | Material | Refractive index | Physical film thickness [nm] |
|---|---|---|---|
| Convex surface | | | |
| First layer | SiO2 | 1.4660 | 30.0 |
| Second layer | ZrO2 | 2.0558 | 121.5 |
| Third layer | SiO2 | 1.4660 | 157.0 |
| Fourth layer | ZrO2 | 2.0684 | 138.0 |
| Fifth layer | SiO2 | 1.4660 | 150.0 |
| Sixth layer | ZrO2 | 2.0684 | 21.0 |
| Seventh layer | SiO2 | 1.4660 | 111.5 |
| Concave surface | | | |
| First layer | SiO2 | 1.4660 | 70.0 |
| Second layer | ZrO2 | 2.0558 | 24.0 |
| Third layer | SiO2 | 1.4660 | 20.0 |
| Fourth layer | ZrO2 | 2.0684 | 95.0 |
| Fifth layer | SiO2 | 1.4660 | 85.0 |

TABLE 8

Comparative Example 3

| | Material | Refractive index | Physical film thickness [nm] |
|---|---|---|---|
| Convex surface | | | |
| First layer | SiO2 | 1.4660 | 26.0 |
| Second layer | ZrO2 | 2.0558 | 120.0 |
| Third layer | SiO2 | 1.4660 | 161.0 |
| Fourth layer | ZrO2 | 2.0684 | 126.0 |
| Fifth layer | SiO2 | 1.4660 | 173.0 |
| Sixth layer | ZrO2 | 2.0684 | 27.0 |

TABLE 8-continued

Comparative Example 3

| | Material | Refractive index | Physical film thickness [nm] |
|---|---|---|---|
| Seventh layer | SiO2 | 1.4660 | 101.0 |
| Concave surface | | | |
| First layer | SiO2 | 1.4660 | 70.0 |
| Second layer | ZrO2 | 2.0558 | 24.0 |
| Third layer | SiO2 | 1.4660 | 20.0 |
| Fourth layer | ZrO2 | 2.0684 | 95.0 |
| Fifth layer | SiO2 | 1.4660 | 85.0 |

TABLE 9

Comparative Example 4

| | Material | Refractive index | Physical film thickness [nm] |
|---|---|---|---|
| Convex surface | | | |
| First layer | SiO2 | 1.4660 | 29.0 |
| Second layer | ZrO2 | 2.0558 | 121.0 |
| Third layer | SiO2 | 1.4660 | 161.0 |
| Fourth layer | ZrO2 | 2.0684 | 128.0 |
| Fifth layer | SiO2 | 1.4660 | 170.0 |
| Sixth layer | ZrO2 | 2.0684 | 24.0 |
| Seventh layer | SiO2 | 1.4660 | 104.0 |
| Concave surface | | | |
| First layer | SiO2 | 1.4660 | 29.0 |
| Second layer | ZrO2 | 2.0558 | 121.0 |
| Third layer | SiO2 | 1.4660 | 161.0 |
| Fourth layer | ZrO2 | 2.0684 | 128.0 |
| Fifth layer | SiO2 | 1.4660 | 170.0 |
| Sixth layer | ZrO2 | 2.0684 | 24.0 |
| Seventh layer | SiO2 | 1.4660 | 104.0 |

TABLE 10

Comparative Example 5

| | Material | Refractive index | Physical film thickness [nm] |
|---|---|---|---|
| Convex surface | | | |
| First layer | SiO2 | 1.4660 | 70.0 |
| Second layer | ZrO2 | 2.0558 | 24.0 |
| Third layer | SiO2 | 1.4660 | 20.0 |

TABLE 10-continued

Comparative Example 5

| | Material | Refractive index | Physical film thickness [nm] |
|---|---|---|---|
| Fourth layer | ZrO2 | 2.0684 | 95.0 |
| Fifth layer | SiO2 | 1.4660 | 85.0 |
| Concave surface | | | |
| First layer | SiO2 | 1.4660 | 70.0 |
| Second layer | ZrO2 | 2.0558 | 24.0 |
| Third layer | SiO2 | 1.4660 | 20.0 |
| Fourth layer | ZrO2 | 2.0684 | 95.0 |
| Fifth layer | SiO2 | 1.4660 | 85.0 |

TABLE 11

Comparative Example 6

| | Material | Refractive index | Physical film thickness [nm] |
|---|---|---|---|
| Convex surface | | | |
| First layer | SiO2 | 1.4660 | 45.0 |
| Second layer | ZrO2 | 2.0558 | 25.0 |
| Third layer | SiO2 | 1.4660 | 28.0 |
| Fourth layer | ZrO2 | 2.0684 | 35.0 |
| Fifth layer | SiO2 | 1.4660 | 116.0 |
| Concave surface | | | |
| First layer | SiO2 | 1.4660 | 45.0 |
| Second layer | ZrO2 | 2.0558 | 25.0 |
| Third layer | SiO2 | 1.4660 | 28.0 |
| Fourth layer | ZrO2 | 2.0684 | 35.0 |
| Fifth layer | SiO2 | 1.4660 | 116.0 |

Figure 2:
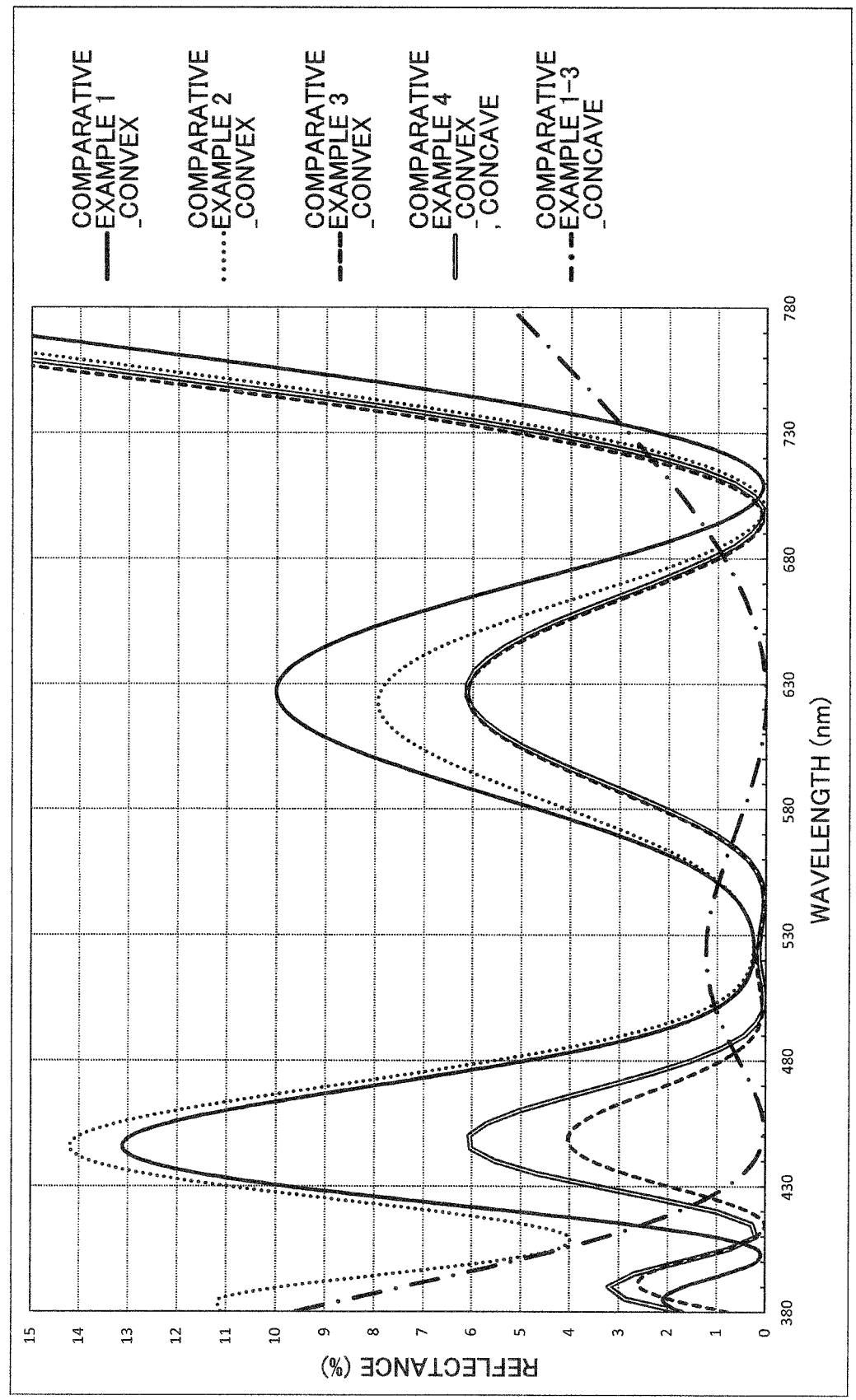
FIG. 2 shows a graph representing a spectral reflectance distribution in a visible region according to each of comparative examples 1 to 4
Figure 3:
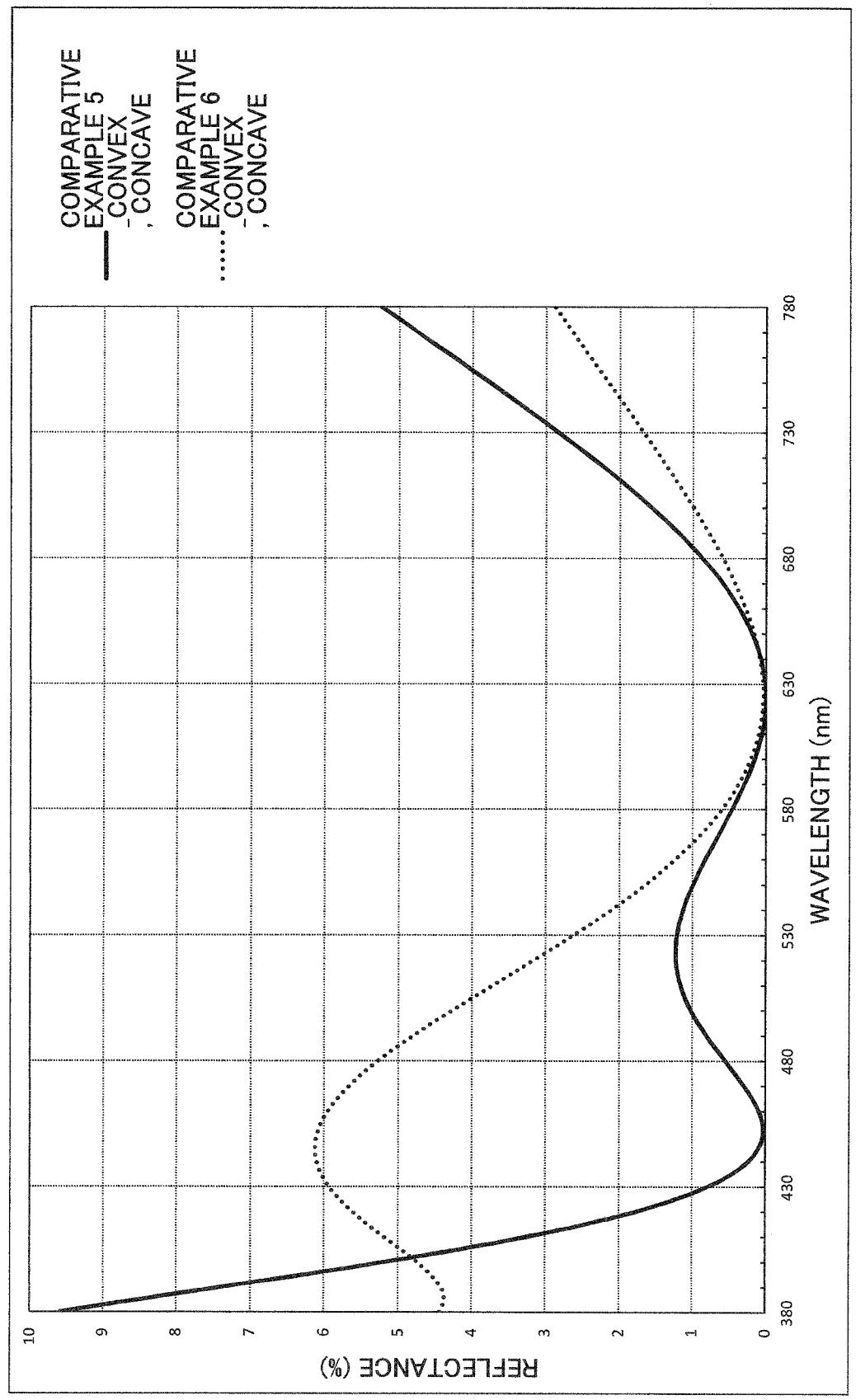
FIG. 3 shows a graph representing a spectral reflectance distribution in a visible region according to each of comparative examples 5 and 6.

In examples 1 to 5 and comparative examples 1 to 6, a luminous reflectance (D65 light rays, viewing angle of 2 degrees) on each of the convex surface side and the concave surface side and a spectral reflectance distribution in a visible region (in this case, a range of wavelengths that were not less than 380 nm and not greater than 780 nm) were measured (FIG. 1 to FIG. 3, [Table 12]), and a reflectance, at each of wavelengths of 450 nm and 630 nm, on each of the convex surface side and the concave surface side was obtained ([Table 12]).

In examples 1 to 5 and comparative examples 1 to 6, the optical multilayer film on at least the convex surface side was designed to obtain a maximal value appearing at each of wavelengths of 450 nm and 630 nm in the reflectance distribution. The maximal value at a wavelength of 450 nm was set in order to increase a blue light ray cutting rate and effectively cut light with a sharp intensity peak at a wavelength of 450 nm. The light is emitted from various displays (blue color in three primary colors of light emitted by a LED) particularly in a personal computer (PC) or a mobile terminal. The maximal value at a wavelength of 630 nm was set in order to reduce yellowness caused by the blue light cutting function.

TABLE 12

| | Reflectance on convex surface side | | Reflectance on concave surface side | | Luminous reflectance (%) | |
|---|---|---|---|---|---|---|
| | 450 nm | 630 nm | 450 nm | 630 nm | Convex surface | Concave surface |
| Example 1 | 9.8% | 6.1% | 0.0% | 0.0% | 1.64 | 0.72 |
| Example 2 | 9.7% | 7.8% | 0.0% | 0.0% | 1.83 | 0.72 |
| Example 3 | 6.0% | 6.1% | 0.0% | 0.0% | 1.64 | 0.72 |
| Example 4 | 8.0% | 6.2% | 0.0% | 0.0% | 1.76 | 0.72 |
| Example 5 | 4.0% | 4.2% | 4.0% | 4.2% | 1.11 | 1.11 |
| Comparative example 1 | 12.9% | 9.9% | 0.0% | 0.0% | 3.49 | 0.72 |
| Comparative example 2 | 14.0% | 7.8% | 0.0% | 0.0% | 3.07 | 0.72 |
| Comparative example 3 | 4.0% | 6.0% | 0.0% | 0.0% | 1.62 | 0.72 |
| Comparative example 4 | 6.0% | 6.1% | 6.0% | 6.1% | 1.64 | 1.64 |
| Comparative example 5 | 0.0% | 0.0% | 0.0% | 0.0% | 0.72 | 0.72 |
| Comparative example 6 | 6.1% | 0.0% | 6.1% | 0.0% | 1.74 | 1.74 |

In examples 1 to 5 and comparative examples 1 to 6, a YI value was obtained ([Table 13]) and a blue light ray cutting rate was calculated ([Table 13]).

TABLE 13

|  | YI value | Blue light ray cutting rate (%) | Acceptance determination | | | |
|---|---|---|---|---|---|---|
|  |  |  | YI | Luminous reflectance | Blue light ray cutting rate | Evaluation as to ghost |
| Example 1 | 4.4 | 10.8 | good | good | good | good |
| Example 2 | 3.7 | 10.5 | good | good | good | good |
| Example 3 | 1.6 | 8.3 | good | good | good | good |
| Example 4 | 3.0 | 9.7 | good | good | good | good |
| Example 5 | 1.7 | 8.7 | good | good | good | good |
| Comparative example 1 | 4.2 | 13.3 | good | poor | good | poor |
| Comparative example 2 | 6.3 | 14.3 | poor | poor | good | poor |
| Comparative example 3 | 0.2 | 7.0 | good | good | allowable | good |
| Comparative example 4 | 2.0 | 10.8 | good | good | good | poor |
| Comparative example 5 | 1.2 | 5.3 | good | good | poor | good |
| comparative example 6 | 10.9 | 14.7 | poor | good | good | poor |

The YI value is represented, according to the following equation, by using tri-stimulus values X, Y, and Z of a sample in standard illuminant in an XYZ color system.

$$YI=100(1.2769X-1.059Z)/Y$$

When the YI value is minus, the tint becomes bluish. When the YI value is plus, the tint becomes yellowish, and the magnitude of the plus value represents a degree of yellowness (yellowness). The XYZ color system is adopted as a standard color system by the CIE (International Commission on Illumination), and is a system based on red, green, and blue that are the three primary colors of light, or additive color mixture thereof. A colorimeter for obtaining the stimulus values X, Y, Z in the XYZ color system is publicly known, and multiplication, of spectral energy of light to be measured, by a color-matching function for each of the stimulus values X, Y, Z for each wavelength, is performed and the results of the multiplication over all the wavelengths in a visible region are accumulated, to obtain the stimulus values X, Y, Z.

The blue light ray cutting rate is calculated by using a calculation formula described in Japanese Industrial Standards "JIS T7333 Appendix C", based on the guideline for a blue light ray cutting rate defined by Japan Medical-Optical Equipment Industrial Association.

That is, the blue light ray cutting rate is a value obtained by subtracting, from 1, a spectral transmittance $\tau_{sb}$ (a range of wavelengths from 380 to 500 nm, with increments of 5 nm, the following [Equation 1]) weighted by an irradiance distribution of sunlight and a radiation spectrum risk (blue light hazard function B (λ)) thereof.

$$\tau_{sb} = \frac{\int_{380\,nm}^{500\,nm} \tau(\lambda) \cdot E_{S\lambda}(\lambda) \cdot B(\lambda) \cdot d\lambda}{\int_{380\,nm}^{500\,nm} E_{S\lambda}(\lambda) \cdot B(\lambda) \cdot d\lambda} = \frac{\int_{380\,nm}^{500\,nm} \tau(\lambda) \cdot WB_{\lambda}(\lambda) \cdot d\lambda}{\int_{380\,nm}^{500\,nm} WB_{\lambda}(\lambda) \cdot d\lambda}$$ [Equation 1]

τ(λ): transmittance $E_{S\lambda}(\lambda)$: spectral irradiance of sunlight

B(λ): blue light hazard function

The evaluation results for the above-described examples 1 to 5 and comparative examples 1 to 6 are indicated in the right portion in [Table 13].

Comparative examples 1 to 3 were each designed such that the seven layer structure was formed on the convex surface side and the five layer structure was formed on the concave surface side, and reflectance characteristics on the convex surface sides were different among comparative examples 1 to 3, and each of a reflectance at a wavelength of 450 nm and a reflectance at a wavelength of 630 nm were different thereamong. In comparative examples 1, 2, the reflectance at each of wavelengths of 450 nm and 630 nm was relatively high. Therefore, the luminous reflectance on the convex surface side was higher than 2.5%, antireflection performance was poor (luminous reflectance was "poor"), uncomfortable ghost (reflection) for a wearer occurred (evaluation as to ghost was "poor"), and visibility was poor in a worn state. The ghost was subjectively evaluated by determining whether or not visibility was hindered by reflection onto the lens worn vertically below a fluorescent lamp. In a case where the reflectance is not higher than 12% in a range of wavelengths that are not less than 400 nm and not greater than 700 nm on the convex surface side (side farther from the eye) and the reflectance is not higher than 6% in the same wavelength range on the concave surface side (side closer to the eye), the evaluation is substantially determined as being good (evaluation as to ghost is "good"). In comparative example 2, the YI value was greater than 6.0, and the yellowness was relatively high (YI was "poor"). In comparative example 3, the reflectance was relatively low at each of wavelengths of 450 nm and 630 nm. Therefore, the antireflection performance was good (luminous reflectance was "good"). However, the blue light ray cutting rate was less than 8%, and was relatively insufficient (blue light ray cutting rate was "poor"). The blue light ray cutting rate may be evaluated as being nearly good in a case where the blue light ray cutting rate is not less than 7%. In this case, the blue light ray cutting rate in comparative example 3 was evaluated as being allowable (blue light ray cutting rate was "allowable") and comparative example 3 may be regarded as an example that belongs to the present invention.

In comparative example 4, the same seven layer structure was formed on the convex surface side and the concave surface side and both the surfaces functioned. Ghost occurred particularly on the concave surface side.

In comparative example 5, the same five layer structure was formed on the convex surface side and the concave surface side, and standard antireflection films were formed on both surfaces. In this case, the blue light ray cutting rate was relatively insufficient.

In comparative example 6, the same five layer structure was formed on the convex surface side and the concave surface side, and standard antireflection films for a blue light cutting lens were formed on both surfaces. In this case, although the blue light ray cutting rate was sufficient, the YI value was substantially greater than 6.0 (10.9) and the yellowness was high. Furthermore, occurrence of ghost was observed.

Meanwhile, in each of examples 1 to 4, the seven layer structure was formed on the convex surface side and the five layer structure was formed on the concave surface side, reflectance characteristics on the convex surface sides were different among examples 1 to 4, and the maximal value of the reflectance at each of wavelengths of 450 nm and 630 nm was appropriately set, so that evaluation was good for all the items of the YI value, the luminous reflectance, the blue light ray cutting rate, and ghost.

In example 5, the same seven layer structure was formed on the convex surface side and the concave surface side, and both the surfaces functioned. The maximal value of the reflectance at each of wavelengths of 450 nm and 630 nm was appropriately set, and the evaluation was good for all the items.

Based on examples 1 to 5, a physical film thickness of each layer in the optical multilayer film on the convex surface side was mainly adjusted, whereby examples 6 to 15 were obtained such that the maximal values in a reflectance distribution in a visible region were shifted so as to appear at either of a wavelength of 440 nm or a wavelength of 460 nm and either of a wavelength of 620 nm or a wavelength of 640 nm, which were ±10 nm of the wavelengths of examples 1 to 5, and were evaluated similarly to examples 1 to 5.

Figure 4:
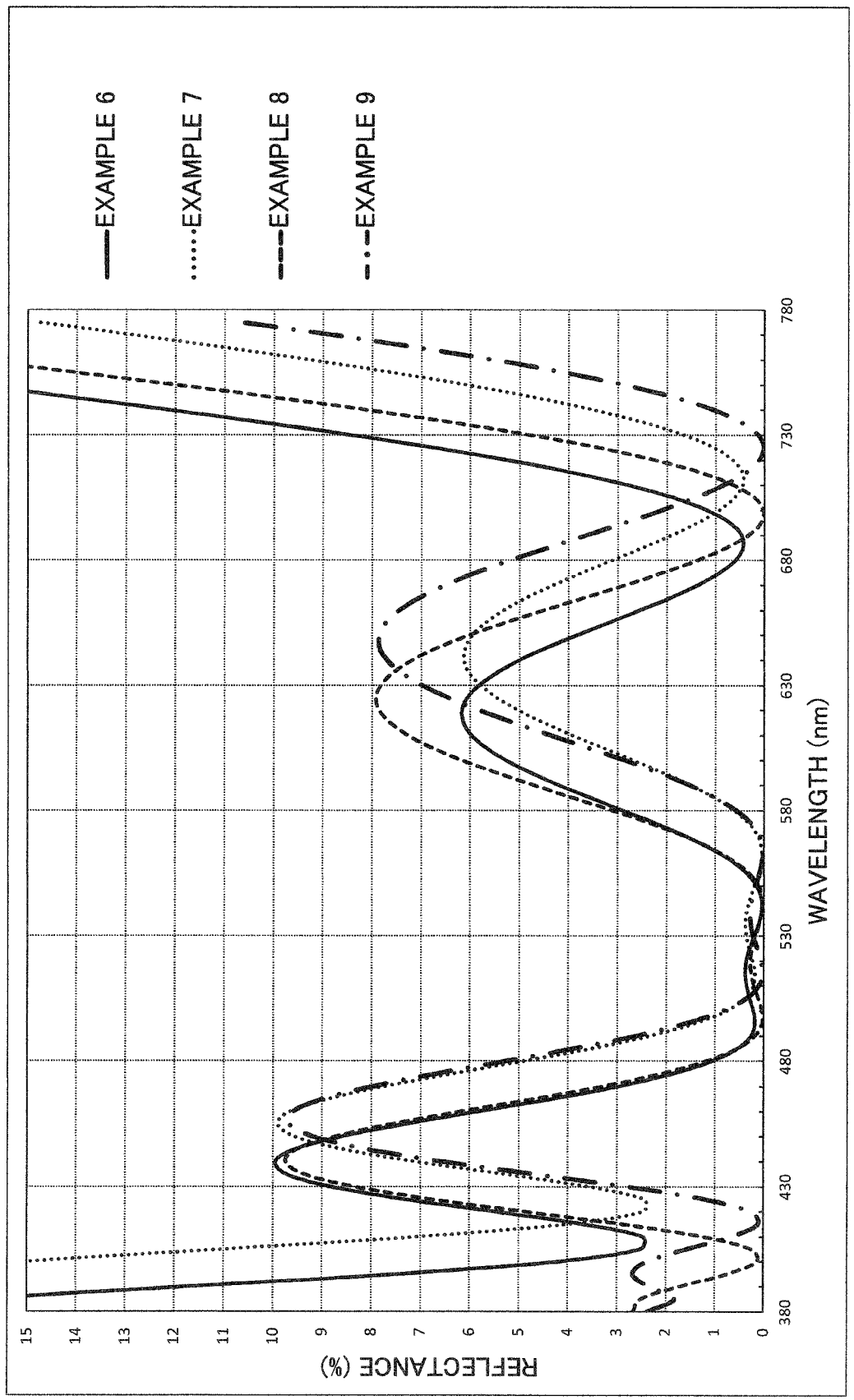
FIG. 4 shows a graph representing a spectral reflectance distribution in a visible region according to each of examples 6 to 9.
Figure 5:
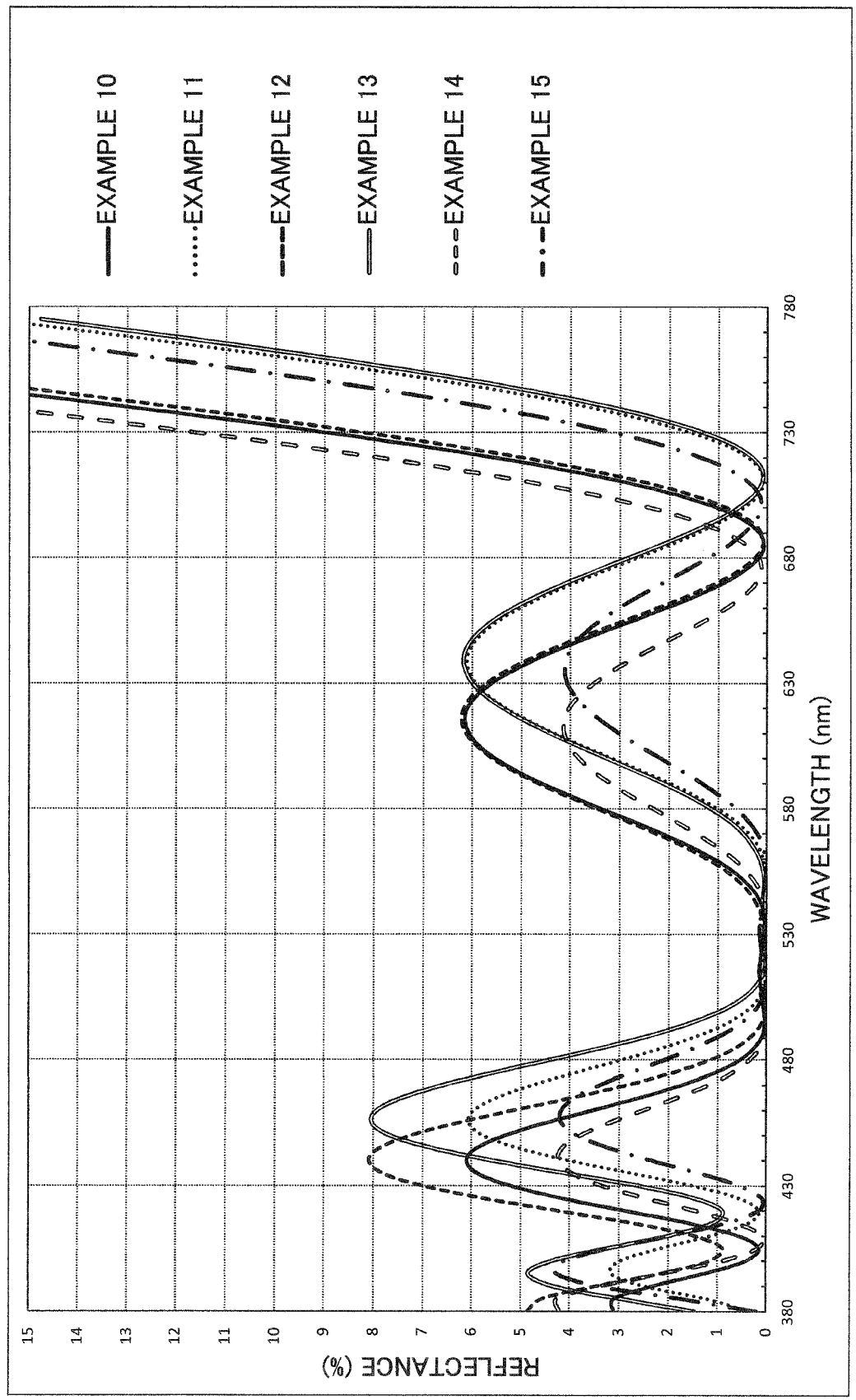
FIG. 5 shows a graph representing a spectral reflectance distribution in a visible region according to each of examples 10 to 15.

FIG. 4 and FIG. 5 show spectral reflectance distributions in the visible region according to examples 6 to 9 and examples 10 to 15.

Furthermore, evaluation results for examples 6 to 15 are indicated below in [Table 14] and [Table 15] as in [Table 12] and [Table 13] for examples 1 to 5.

TABLE 14

| | | Reflectance on convex surface side | | Reflectance on concave surface side | | Luminous reflectance (%) | |
| --- | --- | --- | --- | --- | --- | --- | --- |
| | Peak shift amount | 450 nm | 630 nm | 450 nm | 630 nm | Convex surface | Concave surface |
| Example 6 | Example 1 − 10 nm | 8.58% | 5.81% | 0 | 0 | 1.96 | 0.72 |
| Example 7 | Example 1 + 10 nm | 9.57% | 5.80% | 0 | 0 | 1.42 | 0.72 |
| Example 8 | Example 2 − 10 nm | 8.73% | 7.82% | 0 | 0 | 2.25 | 0.72 |
| Example 9 | Example 2 + 10 nm | 9.20% | 6.99% | 0 | 0 | 1.53 | 0.72 |
| Example 10 | Example 3 − 10 nm | 5.30% | 5.60% | 0 | 0 | 2.01 | 0.72 |
| Example 11 | Example 3 + 10 nm | 5.77% | 5.94% | 0 | 0 | 1.33 | 0.72 |
| Example 12 | Example 4 − 10 nm | 7.22% | 5.70% | 0 | 0 | 2.13 | 0.72 |
| Example 13 | Example 4 + 10 nm | 7.67% | 6.00% | 0 | 0 | 1.48 | 0.72 |
| Example 14 | Example 5 − 10 nm | 3.78% | 3.52% | 3.78% | 3.52% | 1.35 | 1.35 |
| Example 15 | Example 5 + 10 nm | 3.85% | 4.07% | 3.85% | 4.07% | 0.9 | 0.9 |

TABLE 15

| | | | Blue light ray cutting rate (%) | | Acceptance determination | | |
| --- | --- | --- | --- | --- | --- | --- | --- |
| | Peak shift amount | YI value | | YI | Luminous reflectance | Blue light ray cutting rate | Evaluation as to ghost |
| Example 6 | Example 1 − 10 nm | 3.3 | 10.5 | good | good | good | good |
| Example 7 | Example 1 + 10 tun | 5.2 | 10.9 | good | good | good | good |
| Example 8 | Example 2 − 10 nm | 2.5 | 10.5 | good | good | good | good |
| Example 9 | Example 2 + 10 nm | 4.4 | 10.3 | good | good | good | good |
| Example 10 | Example 3 − 10 nm | 0.8 | 8.2 | good | good | good | good |
| Example 11 | Example 3 + 10 nm | 2.2 | 8.2 | good | good | good | good |
| Example 12 | Example 4 − 10 nm | 2.1 | 9.5 | good | good | good | good |

TABLE 15-continued

|  | Peak shift amount | YI value | Blue light ray cutting rate (%) | Acceptance determination | | | |
|---|---|---|---|---|---|---|---|
|  |  |  |  | YI | Luminous reflectance | Blue light ray cutting rate | Evaluation as to ghost |
| Example 13 | Example 4 + 10 nm | 3.6 | 9.6 | good | good | good | good |
| Example 14 | Example 5 − 10 nm | 0.8 | 8.6 | good | good | good | good |
| Example 15 | Example 5 + 10 nm | 2.3 | 8.6 | good | good | good | good |

Examples 6, 7 were designed based on example 1 such that the maximal values in example 6 appeared at wavelengths of 440 nm and 620 nm and the maximal values in example 7 appeared at wavelengths of 460 nm and 640 nm.

Examples 8, 9 were designed based on example 2 such that the maximal values in example 8 appeared at wavelengths of 440 nm and 620 nm and the maximal values in example 9 appeared at wavelengths of 460 nm and 640 nm.

Examples 10, 11 were designed based on example 3 such that the maximal values in example 10 appeared at wavelengths of 440 nm and 620 nm and the maximal values in example 11 appeared at wavelengths of 460 nm and 640 nm.

Examples 12, 13 were designed based on example 4 such that the maximal values in example 12 appeared at wavelengths of 440 nm and 620 nm and the maximal values in example 13 appeared at wavelengths of 460 nm and 640 nm.

Examples 14, 15 were designed based on example 5 such that the maximal values in example 14 appeared at wavelengths of 440 nm and 620 nm and the maximal values in example 15 appeared at wavelengths of 460 nm and 640 nm.

Also in examples 6 to 15, each maximal value of the reflectance was appropriately set, so that evaluation was good for all the items of the YI value, the luminous reflectance, the blue light ray cutting rate, and ghost.

Therefore, also in a case where the maximal values in a reflectance distribution in a visible region appear in a range of wavelengths that are not less than 440 nm and not greater than 460 nm and in a range of wavelengths that are not less than 620 nm and not greater than 640 nm, in addition to a case where the maximal values appear at wavelengths of 450 nm and 630 nm, the spectacle lens that can maintain performance of protection from blue light rays, reduce yellowness, and exhibit good visibility can be provided.

As in each of the above-described examples, the spectacle lens and the spectacles using the spectacle lenses can exhibit excellent visibility and appearance while sufficiently exhibiting performance of protection from blue light rays in a case where the optical multilayer film is formed on the base, the maximal values in the reflectance distribution appear in a range of wavelengths that are not less than 440 nm and not greater than 460 nm and in a range of wavelengths that are not less than 620 nm and not greater than 640 nm, the blue light ray cutting rate calculated by using the calculation formula described in Japanese Industrial Standards "JIS T7333 Appendix C" is not less than 7% (preferably not less than 8%), and the YI value is not greater than 6.

Furthermore, as in each of the above-described examples, in a case where each luminous reflectance is not higher than 2.5%, reflection in a visible region is reduced, and the spectacle lens and the spectacles using the spectacle lenses can exhibit excellent visibility.

Moreover, as in each of the above-described examples, in a case where the reflectance in a range of wavelengths that are not less than 400 nm and not greater than 700 nm is not higher than 12% on the convex surface side, and the reflectance in a range of wavelengths that are not less than 400 nm and not greater than 700 nm is not higher than 6% on the concave surface side, occurrence of ghost can be inhibited, and the spectacle lens and the spectacles using the spectacle lenses can exhibit excellent visibility.

It is explicitly stated that all features disclosed in the description and/or the claims are intended to be disclosed separately and independently from each other for the purpose of original disclosure as well as for the purpose of restricting the claimed invention independent of the composition of the features in the embodiments and/or the claims. It is explicitly stated that all value ranges or indications of groups of entities disclose every possible intermediate value or intermediate entity for the purpose of original disclosure as well as for the purpose of restricting the claimed invention, in particular as limits of value ranges.

What is claimed is:

1. A spectacle lens comprising
   an optical multilayer film formed on at least one surface side of a base,
   wherein a first peak value in a reflectance distribution appears in a wavelength range of 440 nm to 460 nm, and a second peak value appears in a wavelength range of 620 nm to 640 nm,
   wherein a blue light ray cutting rate, calculated by using a calculation formula according to Japanese Industrial Standards "JIS T7333 Appendix C," is not less than 7%, and
   wherein a YI value, derived according to an equation $YI=100(1.2769X-1.059Z)/IY$, using tri-stimulus X, Y and Z values of a sample in a standard illuminant in an XYZ color system, is not greater than 6.

2. The spectacle lens according to claim 1, wherein a luminous reflectance of D65 light rays at a viewing angle of 2° on each surface of the base is not higher than 2.5%, the luminous reflectance being calculated by using a calculation formula according to the Japanese Industrial Standard JIS T7333.

3. The spectacle lens according to claim 1, wherein a reflectance in a wavelength range of 400 nm to 700 nm is not higher than 12% on a convex surface of the base farther from an eye of a viewer, and
   wherein a reflectance in a wavelength range of 400 nm to 700 nm is not higher than 6% on a concave surface of the base closer to the eye.

4. The spectacle lens according to claim 2, wherein a reflectance in a wavelength range of 400 nm to 700 nm is not higher than 12% on a convex surface of the base farther from an eye, and wherein a reflectance in a wavelength range of 400 nm to 700 nm is not higher than 6% on a concave surface of the base closer to the eye of the view.

5. Spectacles comprising the spectacle lens according to claim 1.

* * * * *